126-506
M4136
OR X 9,820
SR
9820X
R. BUCK.
COOKING FIREPLACE.
Patented July 1, 1836.
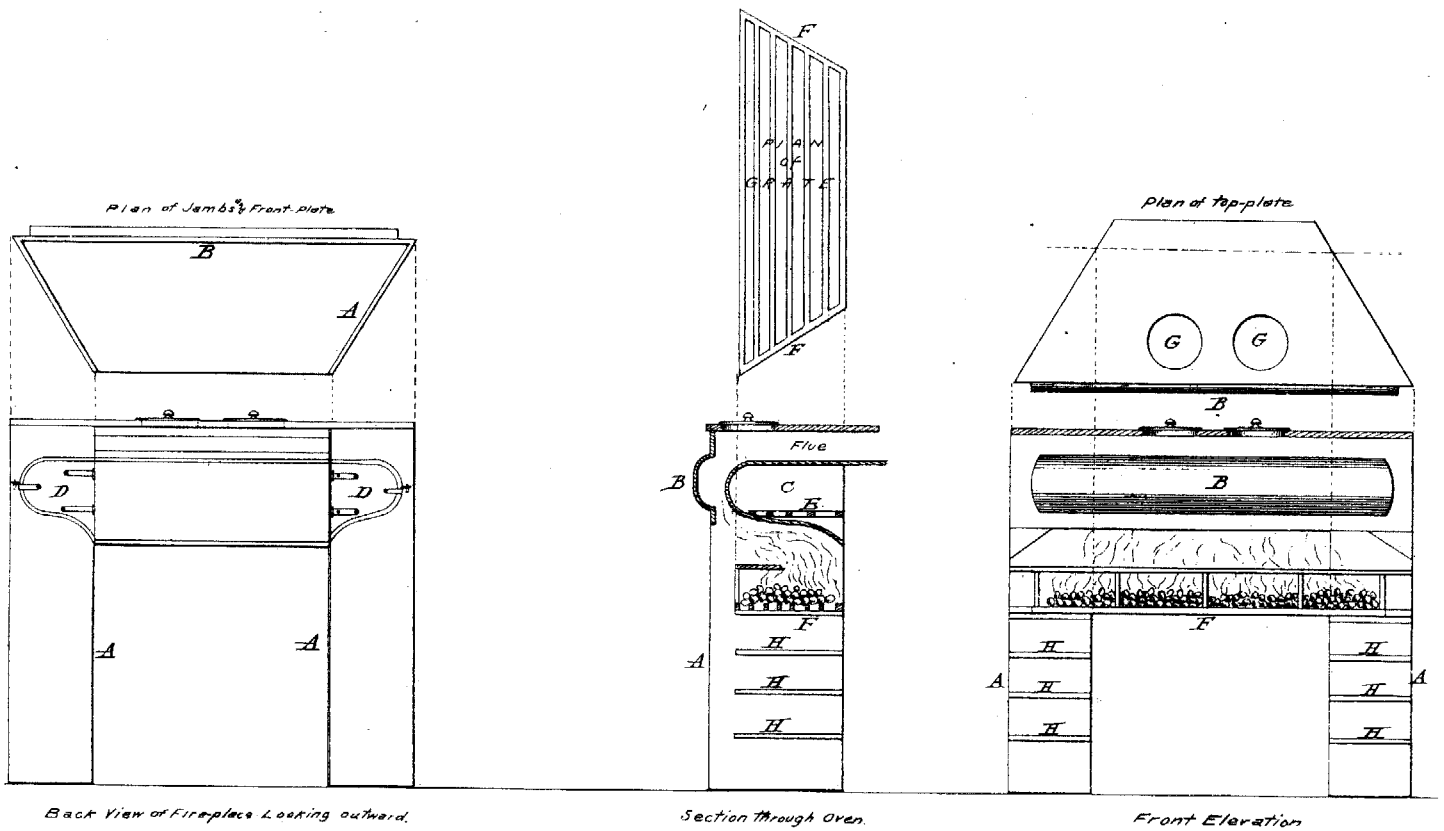
THE NORRIS PETERS CO., PHOTO-LITHO., WASHINGTON, D. C.

Reuben Buck - Acton Maine
Letters Patent

The Schedule referred to in these Letters Patent and making part of the same containing a description in the words of the said Reuben Buck himself of his improvement in the fire place for warming rooms and cooking.

To all to whom these presents shall come. Be it known that I, Reuben Buck of Acton in the County of York and State of Maine Physician have invented a new and useful cooking fire place combining most of the advantages of the close cooking stove with those of the open fire.

The following is a full and exact description thereof [illegible] [illegible]. The jambs are 16 inches wide, 18 inches high in front, and 33 [illegible] a back part. About 2 inches from the bottom of the jambs are cut oven doors. They are 12 inches long & 9 inches high each in front. The doors [illegible] 12 inches from the [illegible] edge of the jamb and 8½ only from its anterior [illegible]. The jamb rises about 4 inches above the door. The jambs are 3 feet 9 inches high in front and 2 feet 6 inch upon the back. The oven passes quite through the fire place and in its form and size is represented by the width of the fire place. (i.e.) the width of the fire place is the length of the oven & the form by the door. It extends [illegible] back to the [illegible] edge of the jambs and drops a little below them on the back part. The bottom is [illegible] by a grate. The front of the oven is cylindrical [illegible] [illegible] portion of its [illegible] the top of the oven is a plane surface and [illegible] the bottom of the oven is covered [illegible] [illegible] the back. SS.

The back piece is about 1 foot wide with a small projection [illegible] about 8 inches wide.

[illegible] about 28 inches from the [illegible] inches from its lower edge.

9820X

[illegible]

[illegible]

[illegible]

[illegible]

[illegible]

[illegible]

[illegible]

[illegible]

[illegible]

9820X

[illegible] greater [illegible] of the Coal of fuel [illegible] than the same amount
of fuel [illegible] proportionately. Thus a larger quantity of the heat -
arising from the Combustion of the fuel burnt in this fire place is
thrown into the room than in any other open fire place with
which I am acquainted and the consequence is a saving of fuel
I am aware that the [illegible] in the [illegible], may be used in this way
but [illegible] of [illegible], where an open fire is used. —

Lastly. I claim as my invention and not previously
known, a grate to be used in the cooking fire place, also intended to
be raised or lowered at pleasure, that the fire may be brought near
the oven and boilers or removed from them according to the degree of
heat wanted for the purposes of Cooking. I do not claim a grate as
my invention but its application to these specific purposes, above
named. This grate may be supported conveniently by small ledges
or upon the inside of the jambs or otherwise.

Witnesses
Isaac Hallock }
Elijah Hallock }
Reuben Buck.

958 n.dr (Patented July 8th 1826.)

Drawing